UNITED STATES PATENT OFFICE

THOMAS J. BOYKIN AND JAMES W. CARMER, OF BALTIMORE, MARYLAND.

IMPROVEMENT IN FERTILIZERS.

Specification forming part of Letters Patent No. 206,077, dated July 16, 1878; application filed March 1, 1878.

*To all whom it may concern:*

Be it known that we, THOMAS J. BOYKIN and JAMES W. CARMER, both of the city of Baltimore and State of Maryland, have invented a certain Improved Fertilizing Compound, of which the following is a specification; and we do hereby declare that in the same is contained a full, clear, and exact description of our invention.

This invention relates to a combination of chemicals to be used in connection with dry peat or muck and unleached ashes, or with any refuse matter having fertilizing properties, to form a fertilizing compound; and it consists in combining dissolved bone, ground plaster, nitrate of soda, sulphate of soda, and sulphate of ammonia, in proportions substantially as follows: Dissolved bone, three (3) bushels; ground plaster, three (3) bushels; nitrate of soda, forty (40) pounds; sulphate of soda, forty (40) pounds; and sulphate of ammonia, thirty-three (33) pounds. This mixture is incorporated with, say, twenty (20) bushels of dry peat or muck and three (3) bushels of unleached ashes.

The manner of preparing a fertilizing compound from the above ingredients is as follows: The peat or muck and ashes, if such matter is used as the base of the mixture, are first thoroughly mixed with the dissolved bone, and the nitrate of soda, sulphate of soda, and sulphate of ammonia, after being dissolved in water, added thereto. The ingredients are next incorporated with the ground plaster, after which the compound is allowed to stand for, say, thirty (30) or forty (40) days, when it becomes ready for use.

We do not claim bone-dust or ground bone as one of the ingredients herein, neither do we use calcined plaster, these substances being foreign to the combination claimed as our invention; but, Having described our said invention, what we claim as new, and wish to secure by Letters Patent of the United States, is—

The within-described compound, consisting of the following ingredients, in about the proportions set forth—that is to say, dissolved bone, three (3) bushels; ground plaster, three (3) bushels; nitrate of soda, forty (40) pounds; sulphate of soda, forty (40) pounds; and sulphate of ammonia, thirty-three (33) pounds, the whole forming a compound to be mixed with a suitable base, for the purpose specified.

In testimony whereof we have hereunto subscribed our names this 28th day of February, in the year of our Lord 1878.

THOMAS J. BOYKIN.
JAMES W. CARMER.

Witnesses:
GEO. MCCAFFRAY,
WM. T. HOWARD.